United States Patent Office 3,508,804
Patented Apr. 28, 1970

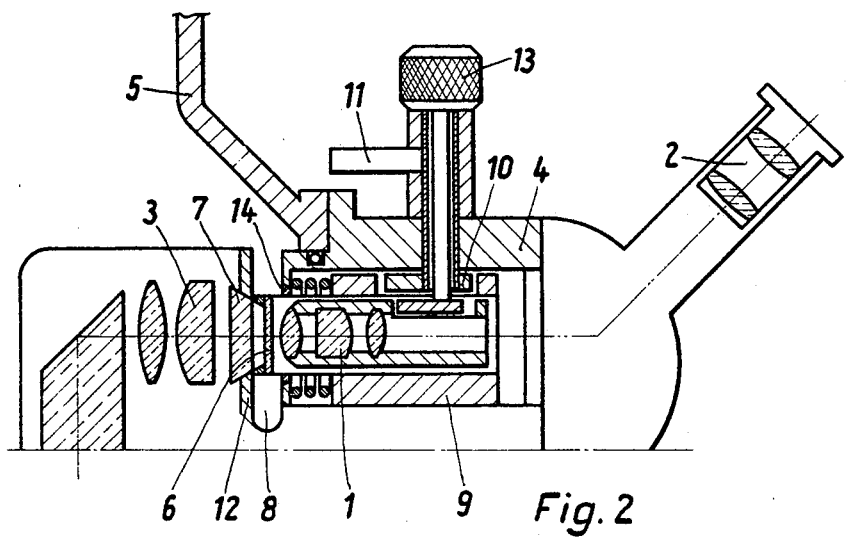
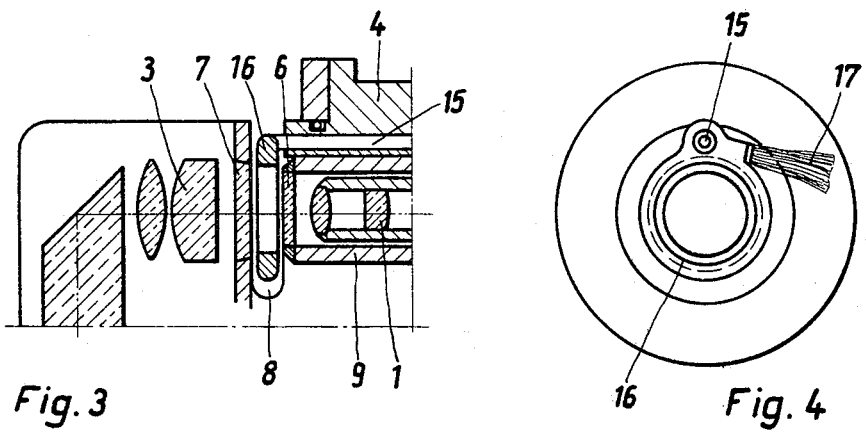
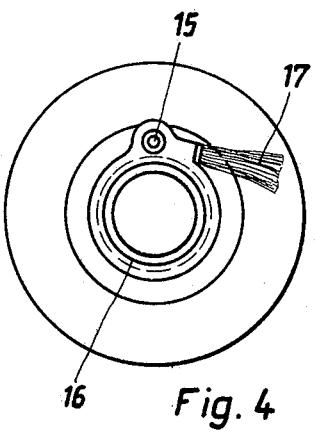

3,508,804
MICROSCOPE INSPECTION ARRANGEMENT
Hans Müller, Im Allmendli, Erlenbach,
Zurich, Switzerland
Filed Oct. 11, 1967, Ser. No. 674,531
Claims priority, application Switzerland, Oct. 13, 1966,
14,911/66, Patent 453,739
Int. Cl. G02b 21/00, 23/00
U.S. Cl. 350—19                              10 Claims

ABSTRACT OF THE DISCLOSURE

An arrangement for observing a liquid contained in a vessel. The ocular of a microscope is arranged outside the wall of the vessel, and the objective of the microscope extends through a fluid-tightly sealed opening into the interior of the vessel. A condensor-type lighting system is so arranged that the light source is located outside the vessel whereas the lens system of the lighting system is located within the vessel. Both the lighting system and the ocular are so arranged that the fluid contents of the vessel cannot intrude. The arrangement is, however, such that the fluid has access to a space between the lens system of the condensor-type lighting device and the objective so as to permit observation of the fluid.

BACKGROUND OF THE INVENTION

The present invention relates to observation devices in general, and more particularly to a device for optically observing a liquid contained in a vessel.

There are many circumstances where it is necessary to observe a fluid, usually a liquid contained in a vessel. The present invention is especially concerned with the observation of liquids in fermentation vessels and will here be discussed from this aspect. It is to be understood however, that the invention and its applicability is by no means limited to this narrow area of use.

It is well known that the contents of a vessel in which fermentation takes place must be frequently observed to determine the operation of the aeration devices, the operation of the mixing devices, the formation of foam and the growth of the microorganisms on which fermentation processes depend. The growth of the microorganisms is, of course, observable not directly but only indirectly in that the contents of the vessel turn cloudy or turbid. This, has heretofore been described as a microscopic observation.

However, macroscopic observation is not sufficient. It is necessary, particularly in fermentation processes, to determine the precise growth and the condition of the microorganisms and to conduct constant micro-biological observations in order to become aware at the earliest possible time of any infection of the container contents by undesired organisms. Such infection can have highly undesirable consequences, particularly in fermentation processes which are continuous and take place over a relatively long period of time. For this purpose, it is known to periodically withdraw samples of the container contents and to subject them exteriorly of the container to microscopic examination. Of course, these samples must be withdrawn in a suitable manner and usually a small pitcock or similar arrangement is provided. This, however, establishes a possible source of contamination of the samples because the pitcock itself may be contaminated by foreign organisms. Furthermore, once withdrawn a host of other contamination possibilities exists. Thus, the withdrawal and further handling of such samples must always be conducted by personnel specifically trained in these procedures and, particularly in the case of long-duration processes, this is a rather expensive approach to the problem, particularly in view of the fact that even so the possibility of contamination of the samples can never be reliably precluded.

SUMMARY OF THE INVENTION

The present invention overcomes the aforementioned disadvantages.

More particularly, the present invention provides an arrangement for observing the contents of a container without endangering these contents by contamination with foreign microorganisms.

This examination takes place, in accordance with the invention, without necessitating the withdrawal of samples from the container.

In accordance with one feature of my invention I provide, in such an observation arrangement wall means which defines a vessel adapted to contain a fluid, and microscope means for enabling the microscopic observation of the contents of the vessel. The microscope means comprises, in accordance with the invention, ocular means which is located exteriorly of the wall means, and a fluid-tight assembly which extends through the wall means and is at least partially located in the interior of the vessel. The assembly includes an objective means which is operatively associated with the ocular means and lighting means which latter includes lens means juxtaposed with the objective means and which is constructed and arranged for defining with the objective means a fluid chamber communicating with the interior of the vessel so that the contents of the vessel have access to and are observable in this fluid chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a fragmentary section of FIG. 1, showing a different position of adjustment of the arrangement;

FIG. 3 is a fragmentary section illustrating another embodiment of the invention; and FIG. 4 is an end view of a detail of the embodiment illustrated in FIG. 3.

DESCRIPTION OF THE PREFERRED EMBODIMENTS

Figure 1:
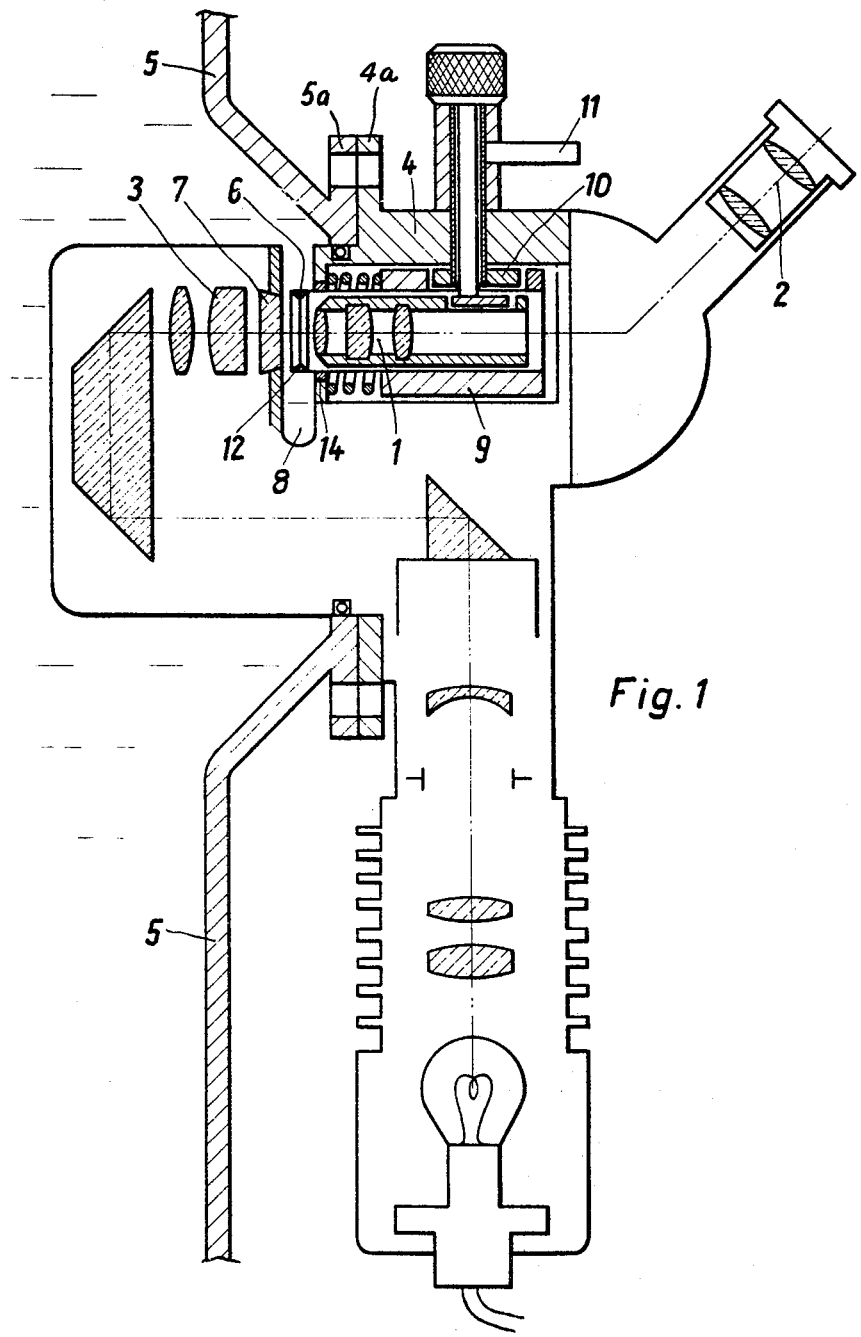
FIG. 1 is a fragmentary sectional view through an arrangement embodying my invention.

Discussing now the drawing in detail, and firstly FIG. 1 thereof, it will be seen that reference numeral 5 illustrates wall means which defines a vessel, here assumed to be a vessel within which a fermentation process is to take place. The vessel is provided with an opening bounded by a flange 5a. Reference numeral 4 identifies a mount provided with a flange 4a by means of which it is suitably secured to the flange 5a and thereby fluid-tightly to the opening in the wall means 5. The objective 1 of a known microscope is arranged within the mount 4, and the ocular 2 of such microscope cooperates with the objective 1 in the usual well-known manner. In the illustrated embodiment a planar glass disk 6 is arranged in parallelism with the objective 1 on the mount 4 in fluid-tight relationship therewith. A conventional condensor-type lighting device is provided and includes a source of illumination located exteriorly of the wall means 5 and a lens system 3 which is juxtaposed with spacing from the disk 6. A further glass disk 7 is arranged forwardly of the lenses system 3 and it is also planar and arranged in parallelism with the lens system 3. The lens system, the source of illumination and the objective 1 all form part of a fluid-tight assembly of which the portion containing the disks 6 and 7, the objective 1 and the lens system 3 extends into the interior of the container defined by the wall means 5. However, the assembly is fluid-tightly sealed against the contents of the container except for a space between the disks 6 and 7 which is exposed to and communicates with the interior of the container and therefore is filled with the contents of the container. This space constitutes a liquid chamber 8.

The disk 6 is mounted in a sleeve 9 within which the objective 1 is arranged and the sleeve 9 can be axially advanced in the direction towards the disk 7 by means of an eccenter arrangement 10 when a handle 11, located exteriorly of the container, is operated. This is not new, inasmuch as such control means are already known in the art. A sealing ring 14, for instance of elastomeric material, effects sealing of the objective against entry of fluid and at the same time assures that the entry of contaminating foreign microorganisms is prevented. A projecting annular wall portion 12 extends axially beyond the disk 6 and serves to engage the mount of the disk 7 when the sleeve 9 is advanced in the direction towards the disk 7. Thus, the wall portion 12 serves to eliminate the advancement of the sleeve 9. At the same time, it serves to define, with exposed sides of the disks 6 and 7, a cuvette which, when the sleeve 9 is advanced so that the wall portion 12 engages the mount of the disk 7 is filled with the contents of the container. The layer of contents thus entrapped is determined in its thickness by the extent to which the wall portion 12 projects beyond the exposed side of the disk 6. It is this layer which can be observed microscopically and without any disturbance when the wall portion 12 engages the mount of the disk 7.

FIG. 2 illustrates this condition of advancement wherein the wall portion 12 engages the mount of the disk 7 and it will be seen that a layer of liquid is entrapped in the cuvetter formed by the exposed sides of the disks 6 and 7 and the wall portion 12. Adjustment of the objective 1 is accomplished by means of a knurled screw 13 which effects axial movement of the objective 1 by means of an accenter drive, a gear drive or in any other suitable manner. Such motion transmitting arrangements are well known in the art. Also well known in the transmission of light from the source of illumination—which is located exteriorly of the wall means 5—to the lens system 3 via suitable prism arrangements.

Coming now to the embodiment illustrated in FIGS. 3 and 4, it will be seen that this basically corresponds to the embodiment of FIGS. 1 and 2. It differs from these figures in that the wall portion 12 is replaced by an annular body 16 which can be moved, for instance by being connected to a shaft 15 which is suitably actuated from the exterior of the container, between an operative position in which it is located intermediate the disks 6 and 7 and an inoperative position in which it is withdrawn from between these disks. The operative position is illustrated in FIG. 3, and it is clear that the member 16 turns in this arrangement about an axis defined by the shaft 15. A wiping arrangement in form of a small brush 17 or the like is provided on the member 16 and is so arranged that it will wipe the exposed sides of the disks 6 and 7, this being advantageously accomplished before the member 16 assumes its final operative position intermediate these exposed sides of the disks 6 and 7. In other words, the brush 17 must be so located that it will move into the space between the disks 6 and 7 before the member 16 moves thereinto. Such wiping arrangements are known from the prior art.

In the embodiment of FIGS. 3 and 4 it is, of course, the axial length of the annular member 16 which determines the thickness of the layer of liquid which becomes entrapped between the outer or exposed sides of the disks 6 and 7. In other words, the cuvette is in this case defined between the exposed sides of the disks 6 and 7 and the annular member 16 which, because it advances along with its shaft 15, in the direction of movement of the sleeve 9, is pressed into sealing engagement between the disks 6 and 7, or rather the mounts thereof, when the sleeve 9 is advanced in the direction towards the disk 7. It is evident that the axial length of the annular member 16 can be selected as desired or in accordance with certain requirements. Thus, if such requirements as particle counts, color measuring and the like necessitate that the layer of entrapped liquid be very thin, the annular member 16 may have an axial length on the order of $\frac{1}{10}$ of a millimeter. However, if other reasons such as considerations of strength and stability dictate that the axial length be greater, the member 16 may have an inner diameter in excess of that of the sleeve 9 and may comprise a second annular portion located within the inner diameter and having an axial length corresponding to the required thickness of the fluid layer which is to be entrapped in the cuvette.

With the device according to the present invention it is clear that the contents of the container defined by the wall means 5 can be constantly microscopically examined, for instance for micro-biological purposes, without requiring the withdrawal of samples from the interior of the container, without danger of contaminating either the contents of the container or the samples and without necessitating special precautions against such contamination every time an examination is to be carried out. Furthermore, operation of the device can be automated if desired. It is clear that actuation of the wiper and advancement of the sleeve 9 can be readily controlled from the exterior, as has already been pointed out, and it will be understood that ordinarily the setting of the objective 1 need not be changed because the spacing of the cuvette from the objective 1 will always be identical. Under these circumstances automatic control is readily possible and can for instance be effected by a program control means which may be actuated electrically, pneumatically or mechanically and which, in conjunction with a suitable timing arrangement, can effect periodic actuation of the wiper, advancement of the sleeve 9 to operative position, and triggering of a micro-photo arrangement so as to obtain a constant record on film of the micro-biological processes taking place in the contents of the container. This permits subsequent control of these processes without necessitating the presence of a skilled operator at every occasion when an observation is undertaken.

Of course, it is to be understood that those parts of the observation device which contact the contents of the container must be capable of being sterilized. This, however, presents no problem in that all parts, including the inner parts of a lighting arrangement, can be constructed in such a manner and of such material as to fulfill this requirement. Difficulties might perhaps arise in conjunction with the optical arrangement of the microscope, particularly the objective. However, if this should be the case, it is a simple enough matter to remove during the sterilizing process the ocular and the objective and simply to leave the sleeve 9 and the disk 6 in position, because sleeve 9 and disk 6 fluid-tightly and pressure-tightly separate the sterile portions of the microscope from those portions—objective and ocular—which need not be sterile. The question of sterilizing, while important, can however be readily solved as pointed out and does not constitute part of the invention.

It will be understood that each of the elements described above, or two or more together, may also find a useful application in other types of arrangements, differing from the types described above.

While the invention has been illustrated and described as embodied in an observation arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement of the character described, comprising in combination, wall means defining a vessel adapted to contain a fluid; and microscope means for microscopic observation of the contents of said vessel, said microscope means comprising ocular means located exteriorly of said wall means, and a fluid-tight assembly extending through said wall means fluid tightly mounted therein and at least partially located in the interior of said vessel, said assembly comprising objective means and lighting means including lens means defining with said objective means a fluid chamber communicating with the interior of said vessel whereby the contents of said vessel have access to and are observable microscopically in said fluid chamber.

2. An arrangement as defined in claim 1, wherein said lighting means is a condenser device comprising a light source located exteriorly of said vessel and a lens system located within said vessel and including said lens means.

3. An arrangement as defined in claim 2, wherein said assembly comprises a tubular objective mount housing said objective means and having a front end located in said vessel, a first planar transparent disk fluid-tightly closing said front end and having an outer side exposed to said fluid, and a second planar transparent disk provided on said lighting means intermediate said lens means and said first disk and also having an outer side exposed to said fluid; and operating means for moving one of said disks towards and away from the other for entrapping fluid between said disks.

4. An arrangement as defined in claim 3, wherein said assembly comprises an annular wall portion surrounding one of said disks and projecting slightly in direction toward the other disk whereby to insure that a space for fluid remains between said disks at all times.

5. An arrangement as defined in claim 4, wherein said wall portion is constituted by a ring mount surrounding said one disk.

6. An arrangement as defined in claim 4, wherein said wall portion is constituted by an annular spacing member provided on said assembly for positioning forwardly of said one disk.

7. An arrangement as defined in claim 6, wherein said annular spacing member is mounted on said assembly for movement between an operative position in which it is positioned forwardly of said one disk intermediate the same and said other disk, and an inoperative position in which it is withdrawn from between said disks; and further comprising actuating means operatively associated with said annular spacing member for moving the same between said positions.

8. An arrangement as defined in claim 7, wherein said actuating means comprises wiper means operative for effecting wiping of said outer sides of said disks.

9. An arrangement as defined in claim 8, wherein said actuating means is constructed and arranged for causing operation of said wiper means in response to movement of said annular spacing member from one to the other of said positions thereof.

10. An arrangement as defined in claim 9; and further comprising control means for axially moving said objective means toward and away from said first disk.

References Cited

UNITED STATES PATENTS

| | | | |
|---|---|---|---|
| 1,635,470 | 7/1927 | Exton | 356—208 X |
| 2,324,304 | 7/1943 | Katzman | 350—208 |
| 2,580,500 | 1/1952 | Albert | 356—208 |
| 3,319,514 | 5/1967 | McAllister | 356—208 |

DAVID SCHONBERG, Primary Examiner

T. H. KUSMER, Assistant Examiner

U.S. Cl. X.R.

350—19, 84, 87, 92; 356—208, 246